United States Patent [19]

Ivan

[11] Patent Number: 4,693,453
[45] Date of Patent: Sep. 15, 1987

[54] CABLE DRUM LATCHING AND UNLATCHING MECHANISM

[75] Inventor: Steve D. Ivan, St. Clair Shores, Mich.
[73] Assignee: Wickes Manufacturing Company, Southfield, Mich.
[21] Appl. No.: 864,544
[22] Filed: May 19, 1986
[51] Int. Cl.$^4$ .................. B62D 43/04; B66D 1/06; B66D 5/34
[52] U.S. Cl. .................. 254/323; 254/357; 254/376; 414/463
[58] Field of Search .......... 254/323, 342, 357, 365, 254/376, 346, 223; 414/426, 427, 463; 74/577.5; 188/82.3, 82.34, 82.4, 82.7; 192/17 R

[56] References Cited

U.S. PATENT DOCUMENTS

| | | | |
|---|---|---|---|
| 485,115 | 10/1892 | Rusgrove | 254/342 X |
| 1,177,767 | 4/1916 | Eggleston | 254/342 X |
| 1,384,384 | 7/1921 | Dow | 254/334 |
| 1,438,394 | 12/1922 | Packer | 254/376 X |
| 1,931,654 | 10/1933 | Haseltine | 188/82.3 |
| 1,983,767 | 12/1934 | Mueller | 224/29 |
| 1,993,744 | 3/1935 | Morison | 254/376 X |
| 2,243,789 | 5/1941 | Benson | 254/186 |
| 2,325,848 | 8/1943 | Gildea et al. | 224/29 |
| 3,372,821 | 3/1968 | Podhajsky | 214/451 |
| 3,390,864 | 7/1963 | Searcy et al. | 254/166 |
| 3,395,819 | 8/1968 | Fruetel | 214/451 |
| 3,539,152 | 11/1970 | Paul et al. | 254/166 |
| 3,554,397 | 1/1971 | Cluff | 214/451 |
| 4,377,366 | 3/1983 | Hamlyn | 254/376 X |
| 4,535,973 | 8/1985 | Dorr et al. | 254/323 |

FOREIGN PATENT DOCUMENTS 723045 2/1955 United Kingdom ................ 254/357

Primary Examiner—John Petrakes
Assistant Examiner—Joseph J. Hail, III
Attorney, Agent, or Firm—Body, Vickers & Daniels

[57] ABSTRACT

A cable winding drum is provided with a ring gear having internal gear teeth and external ratchet teeth, and the drum and gear are supported in a housing for rotation in opposite directions about a drum axis to achieve winding and unwinding of a cable relative to the drum. The drum is rotated in opposite directions by an operating mechanism including a crank actuated crank and pinion assembly, a pawl and a pawl actuating lever. The pinion is supported by the housing and engages the internal gear teeth and, during rotation of the crank in the winding direction, the pinion rotates the drum and the pawl engages the ratchet teeth to preclude rotation of the drum in the unwinding direction. Upon rotation of the crank in the unwinding direction during engagement of the pawl with the ratchet teeth, the cam displaces the pawl actuating lever to release the pawl from engagement with the ratchet teeth to release the drum for rotation in the unwinding direction. Upon subsequent rotation of the crank in the drum winding direction the cam displaces the actuating lever to reengage the pawl with the ratchet teeth and thus preclude rotation of the drum in the unwinding direction during rotation thereof by the crank in the winding direction.

18 Claims, 9 Drawing Figures

CABLE DRUM LATCHING AND UNLATCHING MECHANISM

BACKGROUND OF THE INVENTION

This invention relates to the art of cable winding and unwinding drums and, more particularly, to an automatic latching and unlatching mechanism for controlling the rotation of a cable drum in the unwinding direction.

The present invention finds particular utility in connection with a cable drum type mechanism by which a spare tire is supported in a stored position beneath a vehicle chassis and is lowerable from the stored position to an accessible position in which the tire engages the ground beneath the vehicle and, accordingly, the invention will be described in detail herein in connection with such a spare tire handling mechanism. At the same time, however, it will be appreciated that the invention is applicable in general to cable drum mechanisms in which a cable drum is rotatable in opposite directions to facilitate the elevating and lowering of a load.

Cable drum type spare tire handling mechanisms have been provided heretofore and, generally, have included some form of a reel or drum which is rotatable in opposite directions to provide for the winding and unwinding of a cable or other flexible connector relative thereto. The drum cable has a free end adapted to be releaseably interengaged with a spare tire and, when the cable is wound onto the drum, the spare tire is elevated into a storage position beneath the vehicle. Upon rotation of the drum in the opposite direction to unwind the cable, the spare tire is lowered to ground beneath the vehicle and, generally, is then pulled from beneath the vehicle and disconnected from the cable to enable use of the spare tire.

The storage of a spare tire beneath the chassis of a vehicle is advantageous for a number of reasons including the optimizing of available storage space and improving the aesthetics of interior portions of the vehicle where spare tires are generally stored. Such storage also avoids having to physically lift the spare tire to remove it from within the vehicle or to replace it in the vehicle and, accordingly, avoids the potential soiling and/or damaging of the clothes of the person handling the tire and/or physical injury to the user.

While cable and drum mechanisms heretofore available can provide the foregoing advantages, there are disadvantages with respect to the operation of the prior mechanisms which encumber the ease with which the mechanisms can be operated by the vehicle operator or other user. In particular, the ratchet and pawl arrangements by which a cable drum is held against rotation in the unwinding direction when the spare tire is in its stored position require manual displacement of the pawl to a drum release position to permit rotation of the cable drum in the unwinding direction and thus lowering of the spare tire. The drum is of course loaded for rotation in the unwinding direction by the weight of the spare tire, whereby manual displacement of the pawl to its drum release position requires considerable force in order to overcome the force of the ratchet teeth against the pawl element. Further, because of the location of the cable drum mechanism relative to the vehicle chassis, the pawl may not be conveniently accessible, whereby the manual actuation thereof can require the person doing so to be in a physical position which is uncomfortable and/or is such as to preclude the exertion of optimum physical force to release the pawl, thus making the drum releasing operation more cumbersome.

Moreover, accessibility to the pawl often requires the user's hand or hands to be close to and/or to engage adjacent metal components of the vehicle chassis or the cable drum mechanism, whereby manipulation of the pawl can result in injury to the user. In particular in this respect, the pawl is generally located adjacent the crankshaft by which the drum is rotated in the winding direction and, upon release of the pawl, the drum and thus the crankshaft rotate at high speed as the spare tire free falls to the ground. Thus, the rotating shaft becomes a potential cause of injury should the user's hand come into contact therewith during such rotation. Such potential injury is promoted if the pawl is spring biased to its ratchet engaging position and, thus, must be held in the release position during the unwinding rotation of the drum. If the pawl is not spring biased, then it must be reset when it is desired to return the spare tire or its replacement to the stored position. While such resetting of the pawl is not as physically difficult or potentially harmful with respect to the user, it is nonetheless a further manual operation which the user is subjected to prior to rotating the drum to return the tire to its stored position. Should the user forget to reset the pawl, then the ensuing rotation of the cable drum in the winding direction to elevate the tire to its stored position is without any restraint against rotation of the cable drum in the unwinding direction should, for example, the user lose his or her grip on the crank handle or other tool by which the drum is being rotated. It will be appreciated that the latter is potentially dangerous in that the crank handle or tool, which is removable from the crankshaft, can either rotate at high speed with the shaft or be thrown off the crankshaft during high speed rotation of the latter resulting from free fall of the tire.

SUMMARY OF THE INVENTION

In accordance with the present invention, a cable drum is provided with an automatically actuated drum holding and release mechanism by which the foregoing disadvantages are overcome or minimized. More particularly in accordance with the invention, the drum holding and release mechanism is actuated by a drive mechanism including a drive shaft rotatable in cable winding and unwinding directions about a drive shaft axis parallel to the drum axis. Rotation of the drive shaft in the cable winding direction causes rotation of the drum in the cable winding direction and actuates the drum holding and release mechanism to a drum holding mode in which the mechanism precludes rotation of the drum in the unwinding direction. Rotation of the drive shaft in the unwinding direction actuates the drum holding and release mechanism to a release mode in which the drum is released to rotate in the unwinding direction thereof. Subsequent rotation of the drive shaft in the winding direction thereof automatically resets the drum holding and release mechanism to the drum holding mode. Accordingly, in connection with a spare tire handling mechanism for example, there is no requirement on the part of the user to manually manipulate a holding mechanism between holding and released positions thereof, whereby both the lowering of a tire from its stored position and return of the tire to its stored position are conveniently and efficiently achieved with minimal physical effort and discomfort to the user and without the potential of injury which accompanies manual manipulation of a drum holding mechanism.

Rotation of the drive shaft in the winding and unwinding directions can be achieved through a removable crank, for example, whereby rotation of the latter in the unwinding direction and the resulting actuation of the holding and release mechanism to the release mode provides the user with the options of removing the crank and allowing the load to free fall, or controlling rotation of the drum in the unwinding direction through the crank. Preferably, a clutch arrangement is provided in the apparatus so that the free fall of the load and thus rotation of the drum in the unwinding direction is restrained or controlled by the user.

In accordance with a preferred embodiment, disclosed herein in connection with a spare tire handling mechanism, the cable drum is provided with a ring gear having gear teeth on the inner periphery thereof and ratchet teeth on the outer periphery thereof, and the holding and release mechanism includes a spring biased pawl adapted to engage and disengage the ratchet teeth and a pawl actuating lever by which the disposition of the pawl relative to the ratchet teeth is controlled. The drive mechanism includes a pinion on the drive shaft engaging the gear teeth and a cam on the drive shaft and operable in response to rotation of the drive shaft in opposite directions to displace the pawl actuating lever and thus the pawl between the engaging and disengaging positions of the pawl relative to the ratchet teeth. Thus, in connection with application of the invention to a spare tire handling mechanism, both the lowering of a tire from its stored position and return thereof to its stored position can be quickly achieved with minimal inconvenience or physical effort on the part of the user, and through the use of a mechanism which is structurally simple and compact thus to promote economy with respect to cost of the mechanism and the utilization of available space relative to a vehicle chassis.

It is accordingly an outstanding object of the present invention to provide a cable drum mechanism with a self-operating drum holding and release mechanism by which the drum is alternately engaged against and released for rotation in the unwinding direction thereof.

Another object is the provision of a cable drum mechanism of the foregoing character which is operable by a user to elevate or lower a load without having to manually engage or disengage a holding mechanism by which rotation of the drum in the unwinding direction is precluded.

Still another object is the provision of a cable drum mechanism of the foregoing character which is operable in response to rotation of a drive mechanism in one direction to rotate the drum in a cable winding direction and is operable in response to rotation of the drive mechanism in the opposite direction to release the drum for rotation in the unwinding direction thereof.

Still a further object is the provision of a cable drum mechanism of the foregoing character which includes a ratchet and pawl arrangement for releaseably holding the drum against rotation in the unwinding direction and a self-actuating mechanism by which the pawl is alternately displaced between holding and released positions relative to the ratchet in response to rotation of a drive mechanism in opposite directions about a corresponding axis.

BRIEF DESCRIPTION OF THE DRAWINGS

The foregoing objects, and others, will in part be obvious and in part pointed out more fully hereinafter in conjunction with the written description of a preferred embodiment of the invention illustrated in the accompanying drawings in which.

DESCRIPTION OF THE PREFERRED EMBODIMENT

Figure 1:
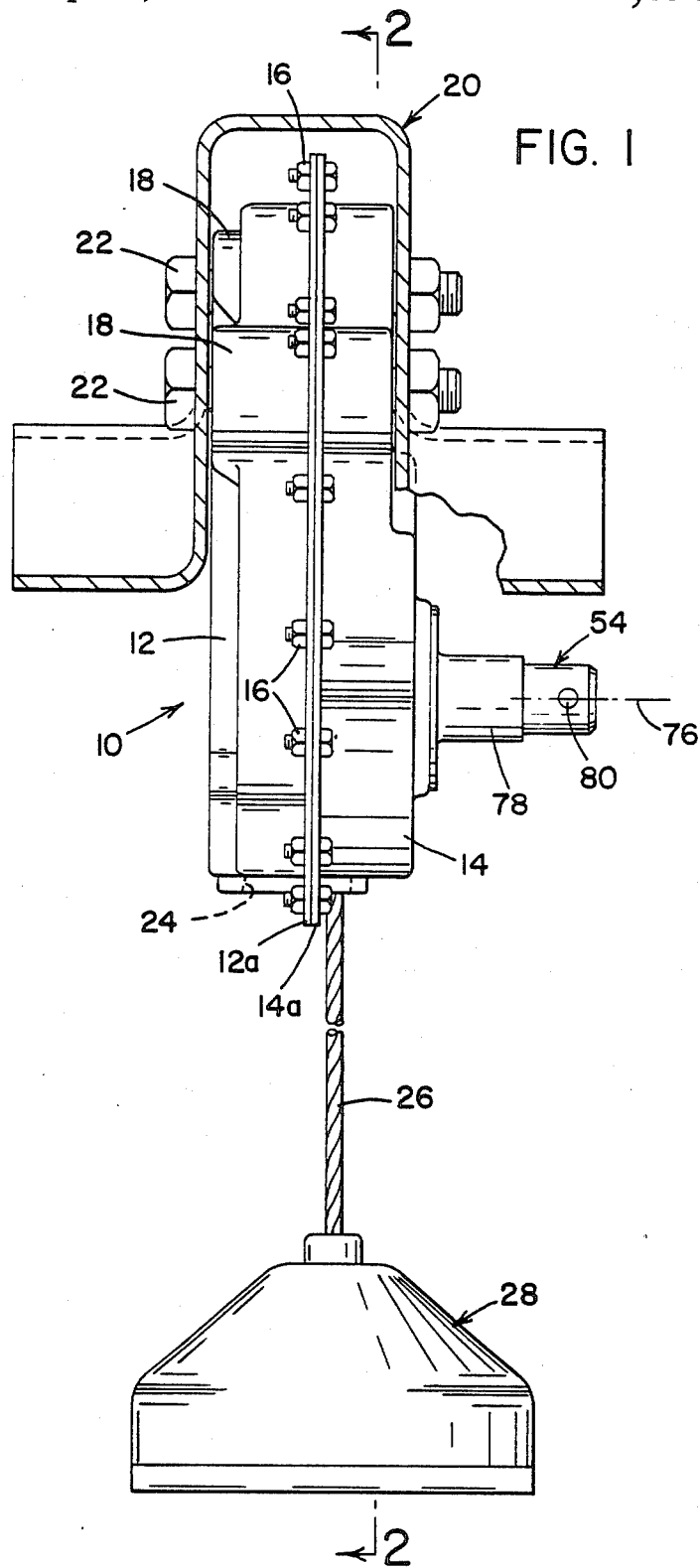
FIG. 1 is an end elevation view of a spare tire handling mechanism incorporating the present invention.

With reference now in detail to the drawings wherein the showings are for the purpose of illustrating preferred embodiments of the invention only and not for the purpose of limiting the invention, FIGS. 1-5 illustrate a spare tire mechanism 10 comprising a housing defined by a pair of dish-shaped sheet metal housing components 12 and 14 having corresponding peripheral flanges 12a and 14a suitably interconnected with one another such as by means of a plurality of nut and bolt assemblies 16. The housing includes a pair of mounting lobes 18 which, in the embodiment shown, facilitate mounting mechanism 10 between the walls of a channel-shaped chassis component 20 such as by means of nut and bolt assemblies 22. The bottom of the housing is provided with an opening 24, and a cable 26 wound on a drum in the housing as set forth more fully hereinafter has its lower end extending downwardly through opening 24 and provided with a tire rim engaging and supporting component 28 which, as is well known, has a contour which enables the component to be introduced through the central opening in the rim of a tire and then positioned to engage the edges of the opening, thus to enable the tire to be elevated, lowered and supported in suspension by cable 26.

Figure 2:
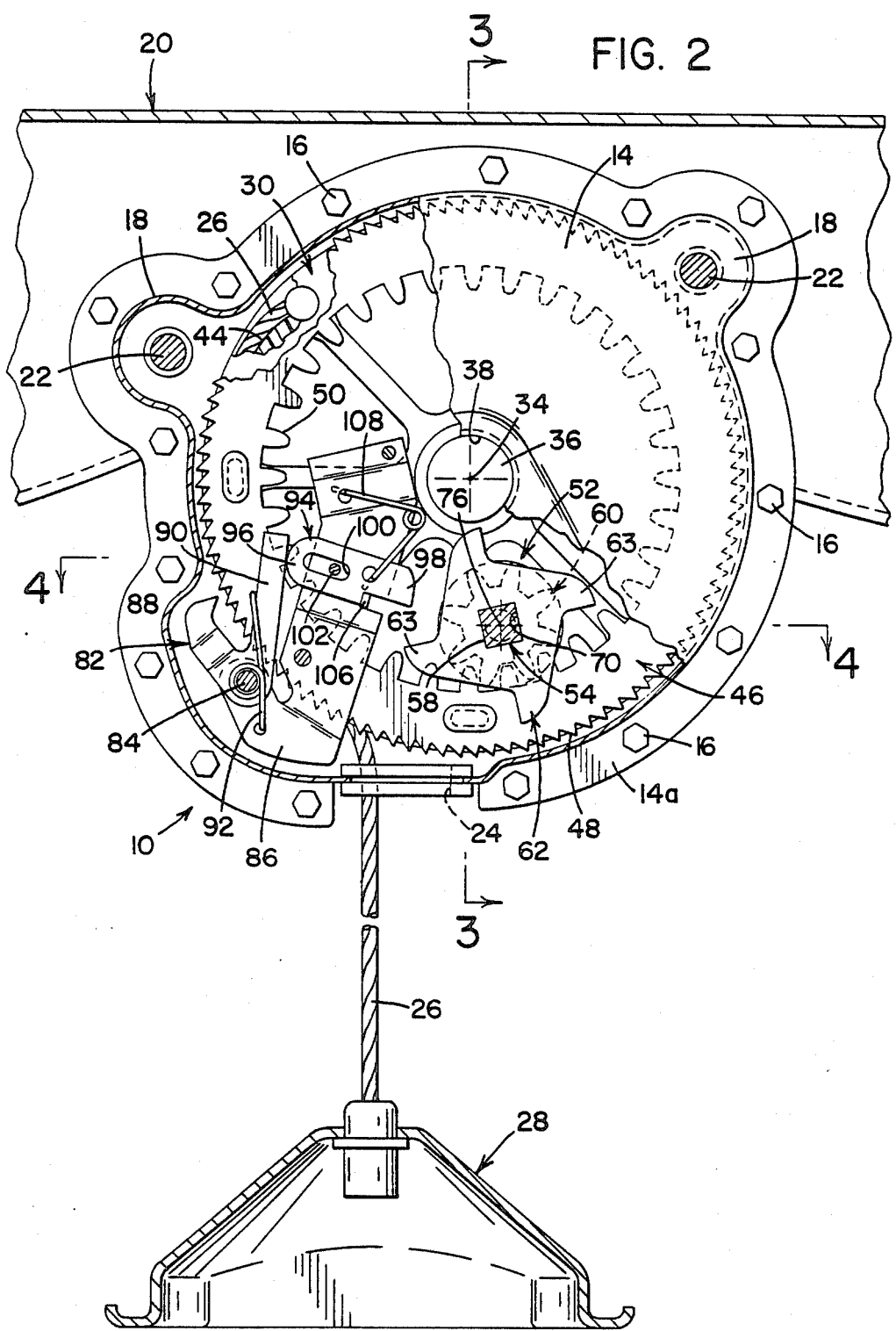
FIG. 2 is a sectional elevation view of the mechanism taken along line 2—2 in FIG. 1.
Figure 3:
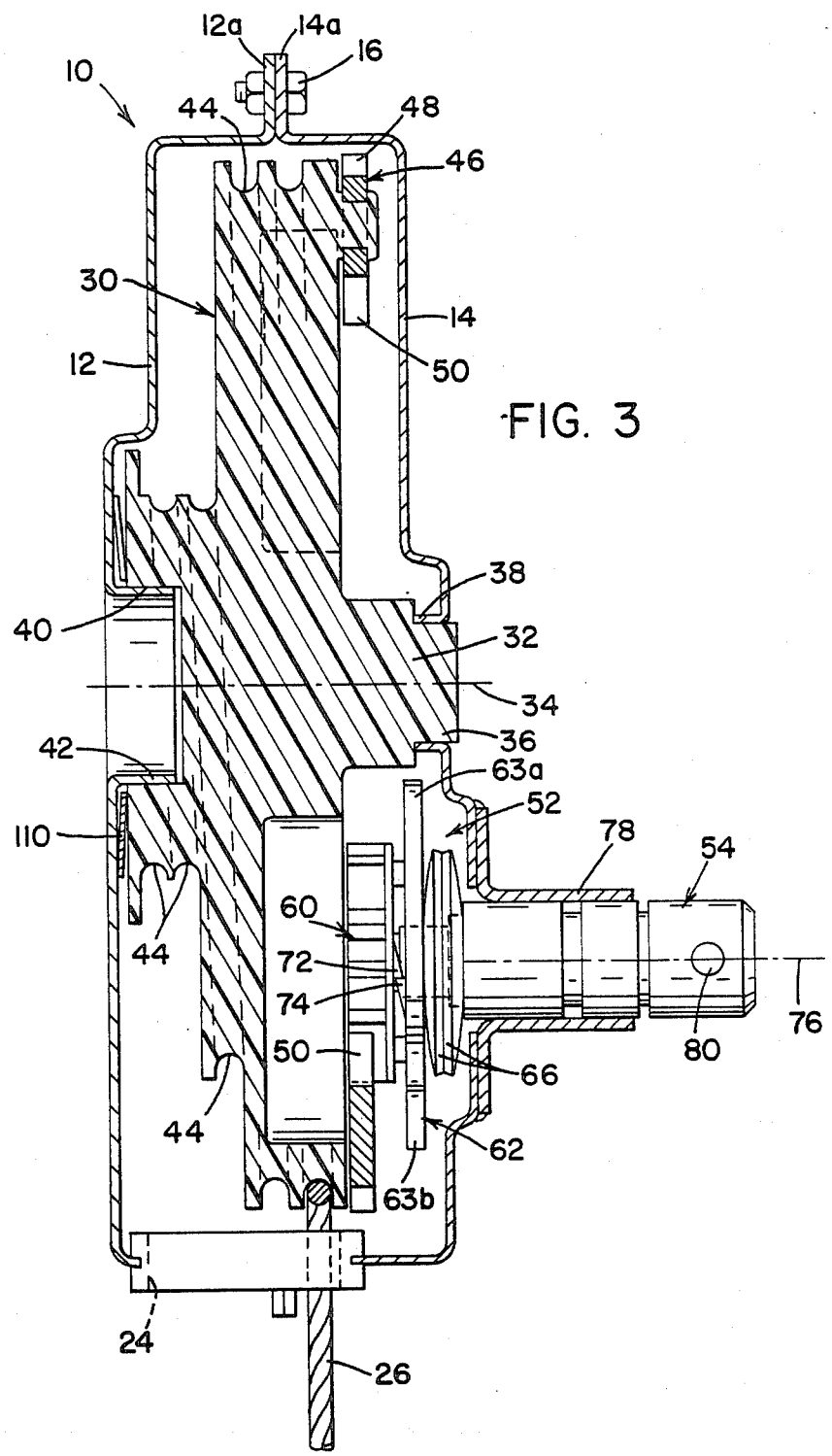
FIG. 3 is a sectional elevation view of the mechanism looking in the direction of line 3—3 in FIG. 2.
Figure 4:
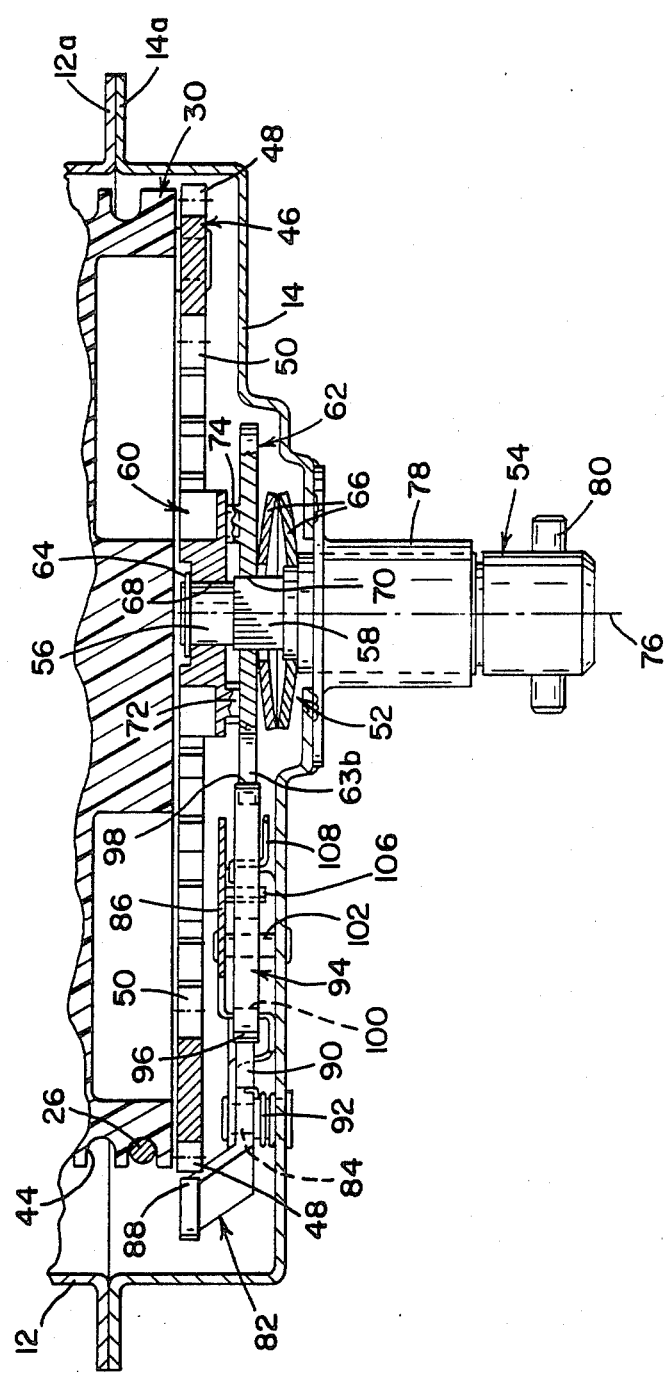
FIG. 4 is a detail view of the drum drive and pawl actuating mechanism taken along line 4—4 in FIG. 2.

As best seen in FIGS. 2-4, the spare tire handling mechanism includes a cable drum 30 having a hub portion 32 mounted between housing portions 12 and 14 and supported thereby for rotation about a drum axis 34. More particularly, hub portion 32 includes a projection 36 extending through and rotatably supported by the axially inwardly extending peripheral flange 38 of an opening in housing component 14, and an axially inwardly extending recess 40 receiving and rotatably supported by the axially inwardly extending peripheral flange 42 of an opening in housing component 12. Drum 30 is preferably produced from a suitable plastic material and is provided about its outer periphery with cable receiving and guiding grooves 44 for cable 26. Further, the outer periphery of drum 30 preferably is comprised of axially adjacent portions of different diameters onto and from which cable 26 is sequentially wound and unwound in the manner and for the purpose described with respect to the cable drum disclosed in my co-pending patent application Ser. No. 631,821, filed Jul. 18, 1984 now U.S. Pat. No. 4,600,352 and the disclosure of which is incorporated herein by reference.

Figure 5:
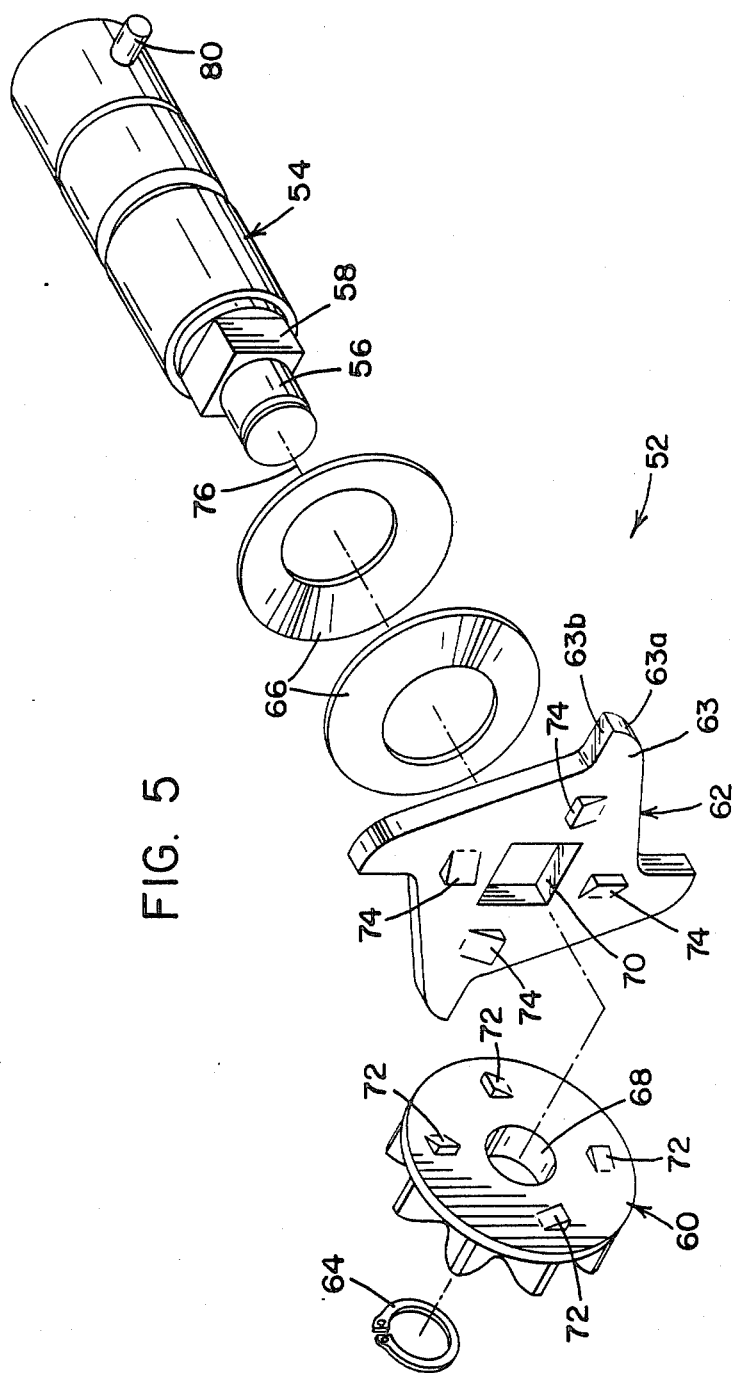
FIG. 5 is an exploded view of the drive shaft assembly of the mechanism.

A ring gear 46 is staked or otherwise secured to drum 30 for rotation therewith and is provided on its outer periphery with ratchet teeth 48 and on its inner periphery with gear teeth 50. Rotation of drum 30 in the winding and unwinding directions thereof is controlled by an operating mechanism which includes a drive shaft assembly 52 rotatably supported by housing component 14. As best seen in FIGS. 3 and 5, drive shaft assembly 52 includes a drive shaft 54 having axially adjacent cylindrical and square portions 56 and 58 at the axially inner end thereof and which respectively support a pinion gear 60 and a cam component 62. Pinion gear 60 and cam component 62 are axially retained on shaft 54 by means of a snap ring 64 on the axially inner end of cylindrical portion 56, and a pair of spring washers 66 are provided between the axially outer side of cam 62 and the shoulder on shaft 54 between square portion 58 and the adjacent axially outer portion of the shaft. Pinion 60 is provided with a cylindrical opening 68 receiving cylindrical shaft portion 56, whereby the pinion is rotatable relative to shaft 54, and cam 62 is provided with a square opening 70 receiving square portions 58 of the shaft, whereby the cam is rotatable with the shaft. Further, the axially outer face of pinion 60 is provided with circumferentially extending ratchet ramps 72, and the axially inner face of cam 62 is provided with circumferentially extending ratchet ramps 74 which are radially aligned with and circumferentially opposed to ratchet ramp 72 on the pinion gear. Cam 62 includes a plurality of lobes 63 each of which is defined by corresponding curved and linear cam surfaces 63a and 63b, respectively, the latter of which surfaces extend radially with respect to axis 76 of shaft 54. The functions of the various components of the drive shaft assembly will become more apparent hereinafter.

Shaft 54 is supported for rotation about a drive shaft axis 76 by means of a flanged sleeve 78 welded or otherwise suitably secured to housing component 14, and the drive shaft assembly is axially positioned for the teeth of pinion gear 60 to mesh with gear teeth 50 of ring gear 46. The axially outer end of drive shaft 54 is adapted to removably receive a tool such as a crank by which the shaft can be rotated and, for this purpose in the embodiment illustrated, the axially outer end of shaft 54 is provided with a cross pin 80. While not shown, it will be appreciated that pin 80 is adapted to be received in axially extending slots in the tool having a recessed end to receive the outer end of the drive shaft.

Figure 6:
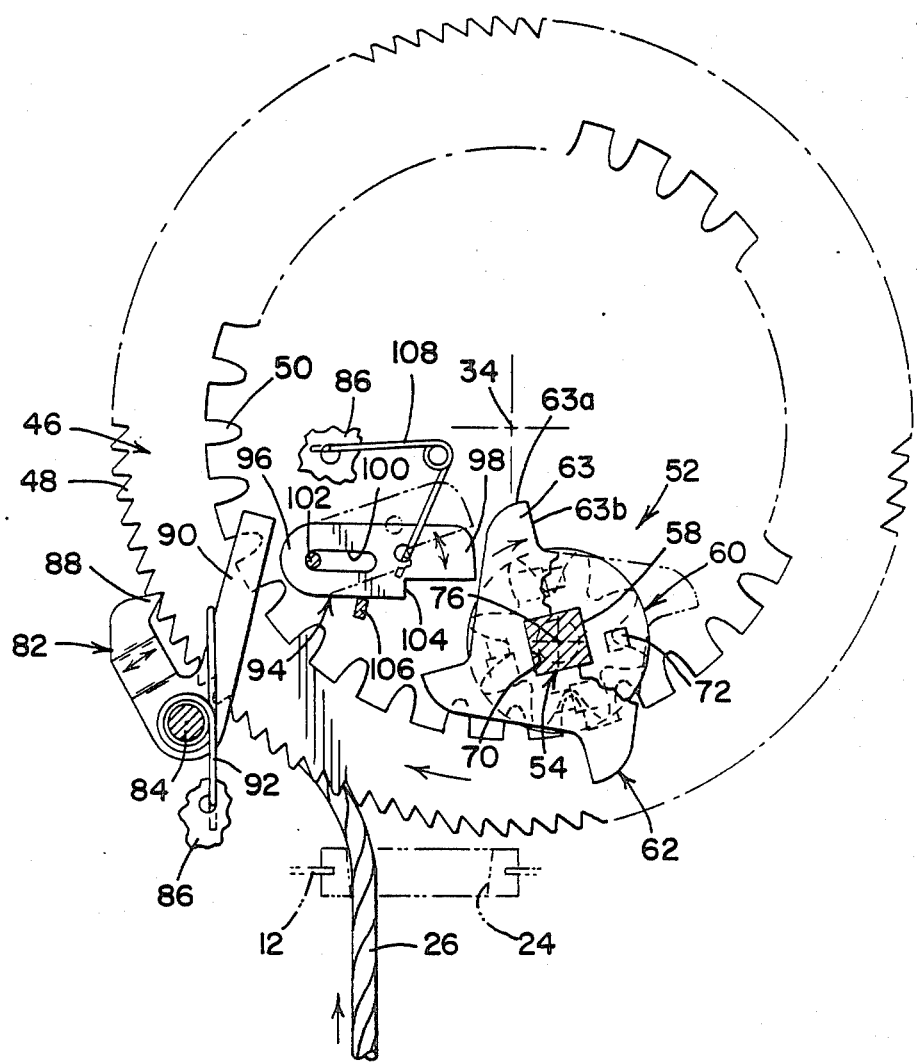
FIGS. 6-8 are somewhat schematic illustrations of the positions and relationships between component parts of the holding and pawl actuating components during tire elevating and lowering operations; and, FIG. 9 is a cross-sectional view showing a modification of the drive shaft assembly.
Figure 7:
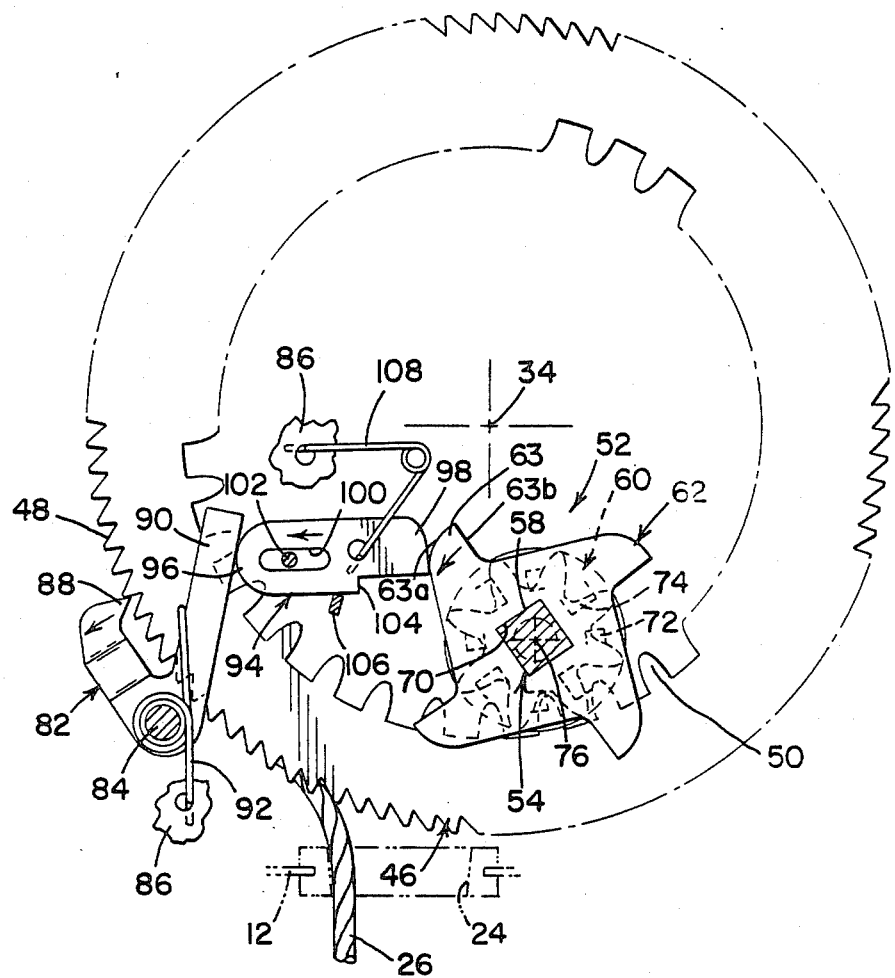
Figure 8:
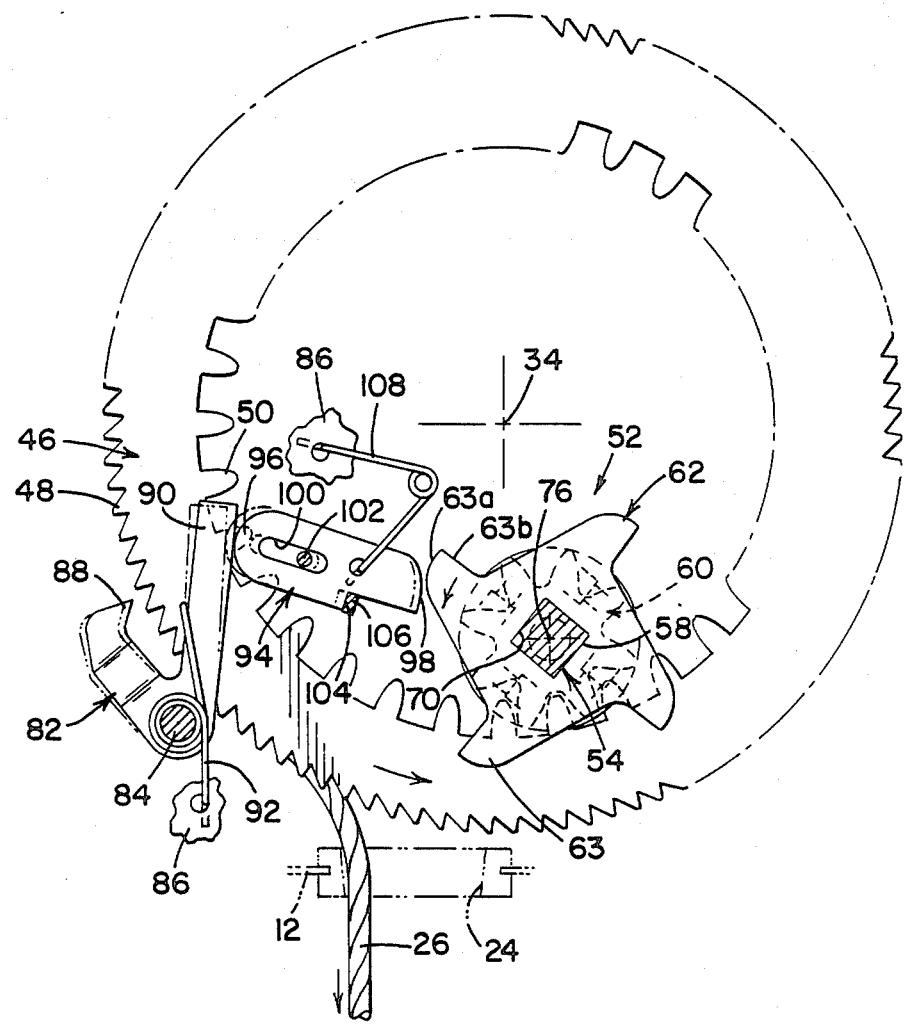

As best seen in FIGS. 2 and 6-8 of the drawing, the drum operating mechanism further includes a drum holding and release mechanism comprising a pawl 82 pivotally mounted by means of a pin 84 between housing component 14 and a mounting bracket 86 suitably secured to the inner surface of the housing component. Pawl 82 includes a nose portion 88 and an actuating leg 90 by which the pawl is displaced as described hereinafter to move nose 88 into and out of engagement with ratchet teeth 48 on ring gear 46. A biasing spring 92 extends about pin 84 and has its opposite ends engaging mounting bracket 86 and pawl leg 90 to bias nose 88 of the pawl toward ratchet teeth 48. The holding and release mechanism further includes a pawl actuating member 94 supported on mounting bracket 86 and having one end 96 adjacent the outer end of pawl leg 90 and the opposite end 98 adjacent lobes 63 of cam 62. More particularly, pawl actuating member 94 is provided with an elongate slot 100 which receives a pin 102 suitably staked to mounting bracket 86 and which pin cooperates with slot 100 to support the pawl actuating member for sliding and pivotal movement relative to cam 62 and pawl 82. One side of pawl actuating member 94 adjacent end 98 thereof is recessed to provide a shoulder 104 which, in the manner and for the purpose described more fully hereinafter, is adapted to releaseably engage an upstanding tab 106 provided on mounting bracket 86. When so engaged, end 96 of the actuating member engages pawl leg 90 to hold the pawl nose 88 out of engagement with ratchet teeth 48 as shown in FIGS. 2 and 8 of the drawing. A biasing spring 108 has its opposite ends engaging mounting bracket 86 and pawl actuating member 94 to exert a biasing force on the latter in the direction from left to right in FIGS. 2 and 8.

It is believed that the operation of the mechanism in connection with the elevating and lowering of a spare tire will be understood from the following description with reference to FIGS. 2 and 6-8 of the drawing. When the component parts are in the position shown in FIG. 2 with pawl nose 88 held out of engagement with ratchet teeth 48, cable 26 has been unwound from drum 30. Therefore, the next operation of the mechanism involves rotating the drum in the winding direction so that the cable is wound on the drum and a tire engaged with tire supporting component 28 is elevated to a stored position beneath the vehicle chassis. Such operation is achieved by engaging a crank or the like with the outer end of drive shaft 54 and rotating the latter clockwise in FIG. 2. Such rotation of shaft 54 rotates cam 62 clockwise, whereby ratchet ramps 74 on cam 62 engage the circumferentially opposed ratchet ramps 72 on pinion gear 60 to rotate the latter clockwise. Clockwise rotation of gear 60 rotates ring gear 46 and thus drum 30 in the winding direction which is clockwise in FIG. 2. As will be appreciated from FIGS. 2 and 6, initial clockwise rotation of drive shaft 54 displaces a cam surface 63b of one of the cam lobes 63 to engage the recessed side of pawl actuator component 94 displacing the latter counterclockwise relative to pin 100 so as to disengage shoulder 104 from tab 106. Such displacement of the pawl actuating member from tab 106 releases pawl 82 for pivotal movement clockwise about pin 84 by pawl biasing spring 92, whereby pawl actuating leg 90 together with spring 108 operate to displace pawl actuating member 94 to the position shown in FIG. 6 in which end 96 of the pawl actuating member is out of engagement with pawl actuating leg 90.

For the reason which will become apparent hereinafter, end 98 of pawl actuating member 94 remains in the path of movement of the outer ends of cam lobes 63. Accordingly, during the continued clockwise rotation of drive shaft 54 the outer ends of cam surfaces 63b engage the outer end of pawl actuating component 94 and rock the latter counterclockwise about pin 102 and against the bias of spring 108, as shown by the broken line position of the pawl actuating member in FIG. 6. During such rocking movement, however, end 96 of the pawl actuating component does not engage pawl leg 90. When pawl 82 is released in the foregoing manner, it will be appreciated that pawl nose 88 is biased into engagement with ratchet teeth 48, whereby counterclockwise rotation of ring gear 46 and thus drum 30 is precluded during continued clockwise rotation of drive shaft 54 to rotate the drum in the winding direction to elevate the tire to its stored position. It will likewise be appreciated that pawl nose 88 operates to hold drum 30 against rotation in the unwinding direction when the tire is in its stored position, or at any time clockwise rotation of the drive shaft is interrupted during elevation of the tire to its stored position.

When it is desired to lower the tire from its stored position, the user engages the tool with the outer end of drive shaft 54 and rotates the latter counterclockwise as viewed in FIGS. 2, 6 and 7. Since nose 88 of pawl 82 is in engagement with ratchet teeth 48 at this time, it will be appreciated that the engagement between pinion gear 60 and gear teeth 50 on ring gear 46 holds pinion 60 against rotation. Initial counterclockwise rotation of drive shaft 54 is relative to pinion 60 and in this respect, it will be appreciated from FIG. 5 that the engagement of cam 62 with square portion 58 of shaft 54 causes cam 62 to rotate with the shaft and that the relative rotational displacement between cam 62 and pinion 60 is enabled by the circumferential spacing between ratchet ramps 74 on the cam and ratchet ramps 72 on the pinion which move away from one another in response to such counterclockwise rotation of shaft 54. As mentioned hereinabove, when pawl actuating member 94 is displaced to the position shown in FIG. 6, end 98 of the pawl actuating component remains in the path of movement of the radially outer ends of cam lobes 63. Accordingly, as will be appreciated from FIGS. 6 and 7, initial counterclockwise rotation of drive shaft 54 displaces a curved cam surface 63a of one of the cam lobes into engagement with end 98 of pawl actuating component 94, whereby the latter is displaced against pawl leg 90 and relative to pin 102 and tab 106 until such time as shoulder 104 on the pawl actuating member moves past tab 106. When the latter occurs, as will be appreciated from FIGS. 2 and 8, the pawl actuating component has pivotally displaced pawl 82 sufficiently for nose 88 to disengage from ratchet teeth 46, and spring 108 operates to bias the pawl actuating component clockwise about pin 102 for shoulder 104 to engage against tab 106 to maintain pawl 82 in its unlatched or released position against the bias of spring 92. As will be further appreciated from the solid line and broken line positions of actuating member 94 in FIG. 8, end 98 of the actuating member remains in the path of cam lobes 63 and the actuating member shifts to the broken line position as cam 60 continues to rotate counterclockwise and thus move lobes 63 past end 98. It will be understood from the foregoing description that such positioning of end 98 in the lobe path enables release of actuating member 94 during the succeeding drum winding operation.

Upon disengagement of pawl nose 88 with ratchet teeth 46, as described above, ring gear 46 and thus drum 30 are free to rotate counterclockwise in FIGS. 2 and 6-8 which is the unwinding direction of the drum. During such initial counterclockwise rotation, pinion 60 is driven counterclockwise by gear teeth 50 of the ring gear to bring the opposed ratchet ramps 72 and 74 on the pinion and cam back into abutting engagement, whereby such counterclockwise rotation is imparted to drive shaft 54. The operator can at this time either control the lowering of the spare tire by maintaining the crank in engagement with the drive shaft and restraining rotation of the latter under the influence of the load of the tire on cable 26, or the operator can disengage the crank from the drive shaft and allow the tire to free fall to the ground. In either event, it is preferred to provide the mechanism with a clutch arrangement operable to restrain total free fall of the tire under its own weight and, in the embodiment described hereinabove, such a slip clutch arrangement is provided by interposing a wave washer 110 between the inner surface of housing component 12 and the adjacent opposed end face of cable drum 30.

Figure 9:
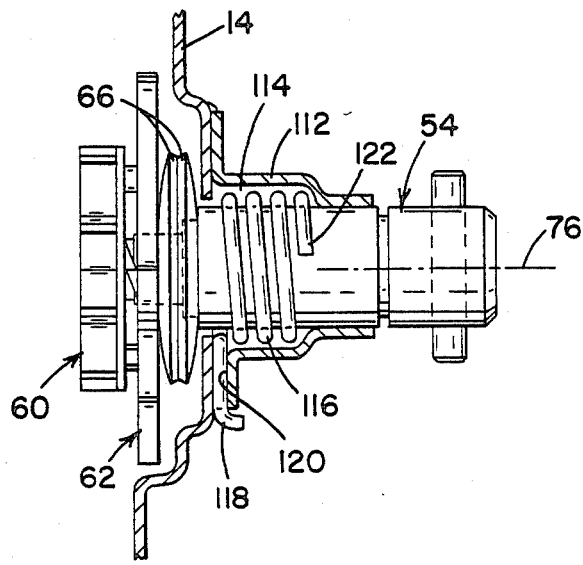

Other clutch arrangements can be devised, and one such alternative arrangement is shown in FIG. 9 wherein the component parts corresponding to the drive shaft assembly described hereinabove are designated by like numerals. In the embodiment shown in FIG. 9, the drive shaft assembly is rotatably supported on housing component 14 by means of a flanged sleeve 112 which is radially stepped between its inner and outer ends to provide a spring chamber 114 extending about drive shaft 54. A one-way clutch spring 116 surrounds drive shaft 54 in chamber 14 and has one end 118 extending radially into a passageway 120 provided therefor in the flange of sleeve 112 to secure the spring against rotation about axis 76 of the drive shaft. The opposite end 122 of the spring is free, and a number of coils are provided between ends 118 and 122 to extend about shaft 54. In a well known manner, the coils extend about the shaft in a direction to permit free rotation of the shaft in one direction and to restrain rotation of the shaft in the opposite direction. Accordingly, in connection with the winding and unwinding apparatus described hereinabove and the function of the spring clutch, it will be appreciated that the coil is wound to permit free rotation of drive shaft 54 in the winding direction of drum 30 and to restrain rotation of shaft 54 and thus the cable drum during rotation of the latter in the unwinding direction. More particularly in this respect, the clutch spring is wound relative to shaft 54 such that rotation of the latter in the drum winding direction tends to expand the coils thus allowing free rotation of the shaft in the latter direction and, in response to rotation of the shaft in the opposite direction, tends to constrict the coils relative to the shaft thus to restrain such rotation.

While considerable emphasis has been placed herein on the struture and operation of the preferred embodiments illustrated and described, it will be appreciated that many embodiments of the invention can be made and that many changes can be made in the embodiments herein disclosed without departing from the principals of the invention. Accordingly, it is to be distinctly understood that the foregoing descriptive matter is to be interpreted merely as illustrative of the invention and not as a limitation.

Having thus described the invention, it is claimed:

1. A cable winding and unwinding mechanism comprising cable drum means having a drum axis, a cable having one end connected to said drum means and having a free end, support means supporting said drum means for rotation in opposite directions about said drum axis, drum drive means rotatable in opposite directions about a fixed drive axis, one of said opposite directions of each said drum means and said drive means being a cable winding direction and the other a cable unwinding direction, drum holding means displaceable between holding and release positions respectively holding said drum means against rotation in said unwinding direction and releasing said drum means for rotation in said unwinding direction, and actuator means separate from said drive means and said holding means and mounted on said support means for displacement between first and second positions respectively corresponding to said holding and release positions, and said drive means including means to actuate said actuator means for displacement between said first and second positions respectively in response to rotation of said drive means in said winding and unwinding directions about said drive axis to alternately displace said holding means between said holding and release positions.

2. The mechanism according to claim 1, and means frictionally restraining rotation of said drum means in said unwinding direction.

3. The mechanism according to claim 1, wherein said drum means includes ratchet means and said holding means includes pawl means on said support means.

4. The mechanism according to claim 3, wherein said pawl means in said holding and release positions respectively engages and disengages said ratchet means, and said actuator means includes pawl actuator means for displacing said pawl means between said holding and release positions.

5. The mechanism according to claim 4, and means frictionally restraining rotation of said drum means in said unwinding direction.

6. The mechanism according to claim 4, wherein said means to actuate said actuator means includes cam means rotatable in opposite directions about said fixed drive axis.

7. The mechanism according to claim 6, wherein said means to actuate said actuator means further includes means to releasably latch said pawl actuator means in said second position and spring means biasing said actuator means toward said pawl means toward said holding position.

8. The mechanism according to claim 7, and means frictionally restraining rotation of said drum means in said unwinding direction.

9. The mechanism according to claim 1, wherein said drive means includes interengaging gears means on said drum means and support means supporting said pinion gear means, and drive shaft means supporting said pinion gear means on said support means for rotation about said drive axis.

10. The mechanism according to claim 9, wherein said drum means includes ratchet means and said holding means includes pawl means on said support means.

11. The mechanism according to claim 10, and means frictionally restraining rotation of said drum means in said unwinding direction.

12. The mechanism according to claim 9, wherein said gear means includes ring gear means on said drum means coaxial with said drum axis and having gear teeth about the inner periphery thereof interengaging with said pinion gear means.

13. A cable winding and unwinding mechanism comprising cable drum means having a drum axis, a cable having one end connected to said drum means and having a free end, support means supporting said drum means for rotation in opposite directions about said drum axis, drum drive means rotatable in opposite directions about a drive axis, one of said opposite directions of each said drum means and said drive means being a cable winding direction and the other a cable unwinding direction, drum holding means displaceable between holding and release positions respectively holding said drum means against rotation in said unwinding direction and releasing said drum means for rotation in said unwinding direction, and means actuated in response to rotation of said drive means in said winding and unwinding directions about said drive axis to alternately displace said holding means between said holding and release positions, said drive means including interengaging gear means on said drum means and support means including pinion gear means, drive shaft means supporting said pinion gear means on said support means for rotation about said drive axis, said gear means further including ring gear means on said drum means coaxial with said drum axis and having gear teeth about the inner periphery thereof interengaging with said pinion gear means, and said ratchet means including ratchet teeth on the outer periphery of said ring gear means.

14. The mechanism according to claim 13, wherein said pawl means in said holding and release positions respectively engages and disengages said ratchet teeth, and said means actuated in response to rotation of said drive means includes pawl actuator means for displacing said pawl means between said holding and release positions.

15. The mechanism according to claim 14, and means frictionally restraining rotation of said drum means in said unwinding direction.

16. The mechanism according to claim 14, wherein said pawl actuator means has first and second positions respectively corresponding to said holding and release positions, and said drive means includes means to actuate said pawl actuator means between said first and second positions.

17. The mechanism according to claim 14, wherein said pawl actuator means includes an actuator member mounted on said support means for displacement between first and second positions respectively corresponding to said holding and release positions of said pawl means, latch means on said support means interengaging with said actuator member to releaseably latch said actuator member in said second position, cam means on said drive shaft means for rotation therewith about said drive axis and having first and second cam surface means, said first cam surface means engaging said actuator member in said first position thereof and displacing said actuator member from said first to said second position in response to rotation of said drive means in said unwinding direction, and said second cam surface means engaging said actuator member in said second position thereof to release said actuator member from said latch means in response to rotation of said drive means in said cable winding direction.

18. The mechanism according to claim 17, and means frictionally restraining rotation of said drum means in said unwinding direction.

* * * * *